United States Patent
Hong et al.

(10) Patent No.: US 12,031,870 B2
(45) Date of Patent: Jul. 9, 2024

(54) SENSOR ASSEMBLY AND METHOD FOR USING THE SAME

(71) Applicant: Aktiebolaget SKF, Gothenburg (SE)

(72) Inventors: Zhichao Hong, Shanghai (CN); Wen Lu, Shanghai (CN); Wei Yang, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/981,429

(22) Filed: Nov. 6, 2022

(65) Prior Publication Data
US 2023/0168128 A1    Jun. 1, 2023

(30) Foreign Application Priority Data
Dec. 1, 2021    (CN) .......................... 202111453870.0

(51) Int. Cl.
*G01D 11/24*    (2006.01)
*G01H 1/00*    (2006.01)
*G01K 1/024*    (2021.01)

(52) U.S. Cl.
CPC ........... *G01K 1/024* (2013.01); *G01D 11/245* (2013.01); *G01H 1/00* (2013.01)

(58) Field of Classification Search
CPC ......... G01H 1/00; G01D 11/245; G01K 1/024
See application file for complete search history.

(56) References Cited

U.S. PATENT DOCUMENTS

| | | | |
|---|---|---|---|
| 11,656,239 B2 * | 5/2023 | Toivanen ................ | G01P 15/18 73/493 |
| 2010/0090906 A1 * | 4/2010 | McGuire .............. | H05K 7/1462 343/702 |
| 2023/0168129 A1 * | 6/2023 | Hong .................... | G01K 1/024 374/208 |

* cited by examiner

*Primary Examiner* — Jamel E Williams
(74) *Attorney, Agent, or Firm* — GARCIA-ZAMOR INTELLECTUAL PROPERTY LAW, LLC; Ruy Garcia-Zamor

(57) ABSTRACT

The present invention provides a sensor assembly including housing; a sensor, disposed in the housing; a conductive member, having an inner portion located inside the housing and an outer portion located outside the housing. The outer portion receives a physical quantity from a component to be sensed and transmits the physical quantity to the sensor through the inner portion, so that the sensor senses the physical quantity and generates a sensing signal; a wireless communication module, receiving the sensing signal and transmits an output signal corresponding to the sensing signal. The invention also provides a method for using a sensor assembly as above.

11 Claims, 2 Drawing Sheets

SENSOR ASSEMBLY AND METHOD FOR USING THE SAME

CROSS-REFERENCE TO RELATED APPLICATIONS

This application claims priority to Chinese Patent Application no. 202111453870.0, filed Dec. 1, 2021, the contents of which is fully incorporated herein by reference.

TECHNICAL FIELD

The invention relates to a sensor assembly and a method for using the sensor assembly.

BACKGROUND

Sensors are usually used to sense physical quantity of interest for various components or structures, and output the sensed data. However, common sensors usually need to transmit the sensed data through cables or wires. For some applications, such as wheels, axles, bearings and stators of trains and subway trains, the vibration and temperature data play an important role to the operation of the equipment. However, due to limitation of space conditions and specific working conditions, it is usually impossible to use sensors connected by cables or wires to sense such vibration and temperature data.

SUMMARY

In view of this, the present invention provides a sensor assembly comprising housing; a sensor, disposed in the housing; a conductive member, having an inner portion located inside the housing and an outer portion located outside the housing, wherein the outer portion receives a physical quantity from a component to be sensed and transmits the physical quantity to the sensor through the inner portion, so that the sensor senses the physical quantity and generates a sensing signal; a wireless communication module, receiving the sensing signal and transmits an output signal corresponding to the sensing signal.

The invention also provides a method for using a sensor assembly as above, the method comprising: directly or indirectly rigidly connecting the outer portion of the conductive member with a component included in a power machine or a vehicle moving relative to the ground, and the component is used as the component to be sensed.

The sensor component integrates the wireless communication technology, eliminates the data cables used by traditional sensors, and can be widely used in scenes such as limited wired installation space, inconvenient wiring and bad working conditions of trains and subway trains, etc., and is convenient for users to remotely obtain sensor data through the cloud.

DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

DETAILED EMBODIMENTS

Figure 1:
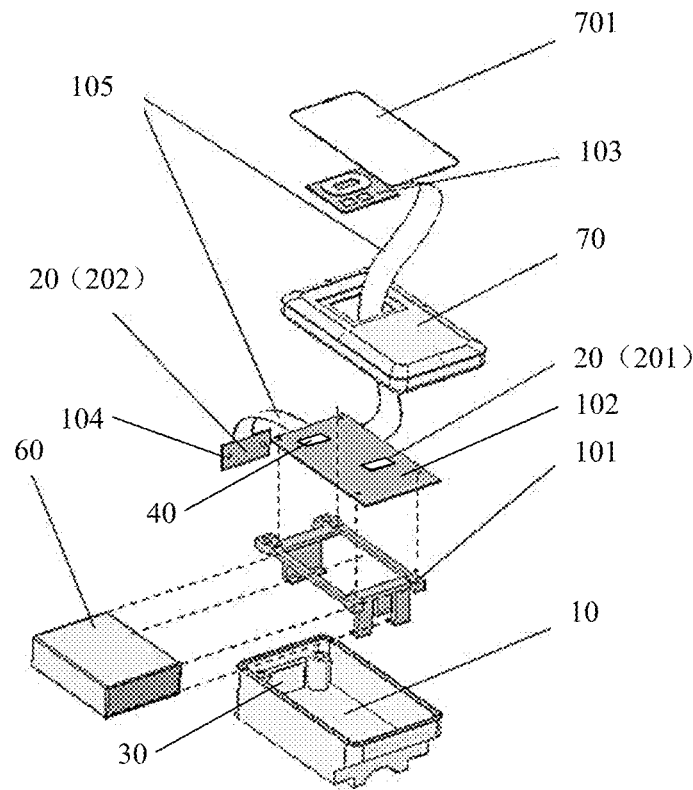
FIG. 1 is an exploded view of a sensor assembly according to a preferred embodiment of the present invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. It should be noted that the term "connection" as used herein includes both the direct connection of related components and the indirect connection of related components through intermediate structures or components.

The invention provides a sensor assembly, as shown in FIGS. 1-4, which comprises: a housing 10; a sensor 20 disposed in the housing 10; a conductive member 30 having an inner portion 301 located in the housing 10 and an outer portion 302 located outside the housing. The outer portion 302 receives the physical quantity from the component 50 to be sensed and transmits the physical quantity to the sensor 20 through the inner portion 301, so that the sensor 20 senses the physical quantity and generates a sensing signal. The sensor assembly also includes a wireless communication module 40 that receives the sensing signal and transmits an output signal corresponding to the sensing signal.

The sensor assembly of the present invention combines the sensor with wireless communication technology, and can sense physical quantity of interest (such as vibration, temperature, and other physical quantity including sound or the like, which will be described later) for various components to be sensed, and send out the sensing results in a wireless manner so as to be received by remote devices, thus avoiding cables and the like needed by traditional sensors for transmitting the sensing results.

The sensor assembly of the present invention is especially suitable for the component to be sensed that cannot use the traditional sensors with cables and wires, especially for power machines or vehicles that move relative to the ground such as trains, subways, mining machines and even ships.

Therefore, the present invention also provides a method for using the sensor assembly, which includes: directly or indirectly rigidly connecting the outer portion of the conductive member with a component included in a power machine or a vehicle moving relative to the ground, and the component is used as the component to be sensed.

Specifically, taking vehicles such as trains and subway trains for example, the component to be sensed include, but are not limited to, their wheels, axles, bearings, stators and other related components. In this application scenario, due to the numerous devices and limited internal space in this kind of vehicles, it is often impossible to set sensors for related devices or components. If conventional sensors that transmit data through wires are adopted, there will also be difficulties in installation, wiring, signal acquisition and other aspects of the sensor, and even bring potential safety risks. In addition, when the conventional wired vibration sensor is used, even a conductive rod or cable extending from the components to be sensed is needed to acquire the vibration signal. Therefore, applying the sensor assembly of the present invention to these scenarios to replace the conventional wired sensor will provide significant advantages and benefits.

Further preferably, the component to be sensed includes a site where the physical quantity is generated, and the part where the outer portion of the conductive member is directly or indirectly rigidly connected with the component to be sensed is set close to the site where the physical quantity is generated. Specifically, taking the bearings for trains and subway trains for example, the component to be sensed can be a bearing assembly, and the vibration and/or temperature generated by the bearing during the rotation can be used as physical quantity to be sensed. As the sensor assembly cannot be directly installed on the bearing itself, the sensor assembly can be installed on the fixed end of the shaft, the housing, the cover, the bracket, etc. of the bearing assembly, but it should be installed as close as possible to the component (i.e. bearing) which is the source of vibration and/or temperature. It should be understood that "close (or as close as possible)" here can be understood as being close to or close to the site where the physical quantity is generated as long as the installation space, installation means, installation conditions, etc. allow, so that the transmission path of the physical quantity is shortened as much as possible to avoid excessive attenuation (especially for the temperature signal).

In addition, the component to be sensed can also include the rigid connection structure directly or indirectly installed to the component to be sensed, such as the rigid connection structure installed to the wheels, axles, bearings, stators, etc. of trains and subway trains. This rigid connection structure is used as a medium for transmitting the physical quantity of interest to the external components of the sensor assembly, so it is also called the component to be sensed. Therefore, the outer portion can receive the physical quantity through rigid connection with the component to be sensed.

According to a further preferred embodiment, the sensor 20 can be implemented as one or more sensors. For example, in the preferred embodiment shown in FIGS. 1-2, the sensor 20 includes a vibration sensor 201, which can be rigidly connected with the inner portion 301 of the conductive member 30, and the physical quantity includes the vibration from the component 50 to be sensed. That is, the vibration from the components to be sensed 50 is transmitted to the inside of the sensor assembly through the outer portion 302 and the inner portion 301 of the conductive member 30, and thus is sensed by the vibration sensor 201. It should be understood that the inner portion 301 of the conductive member 30 can be arranged at any suitable position inside the housing 10, and the outer portion 302 can also be arranged at any suitable position outside the housing 10.

In the preferred embodiment shown in the figure, the inner portion 301 is arranged along one side wall of the housing 10 (or forms a part of the side wall), so that space can be saved for other components in the housing 10. According to other preferred embodiments not shown, the inner portion 301 may also protrude or extend to the middle part of the housing 10 so as to be close to the sensor 20. Alternatively, in an embodiment not shown, the inner portion may be disposed along a plurality of side walls (or form a part thereof).

Figure 2:
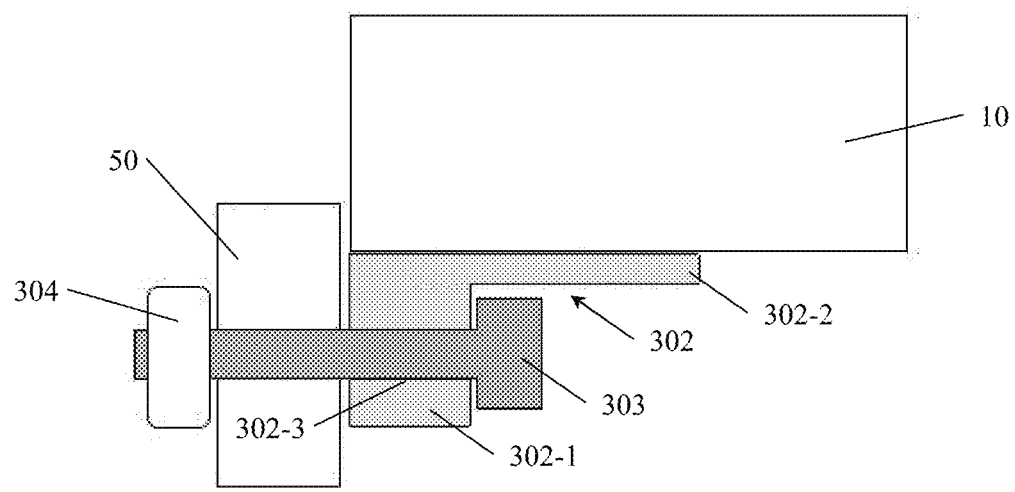
FIG. 2 is a schematic installation diagram of a sensor assembly according to a preferred embodiment of the present invention.
Figure 3:
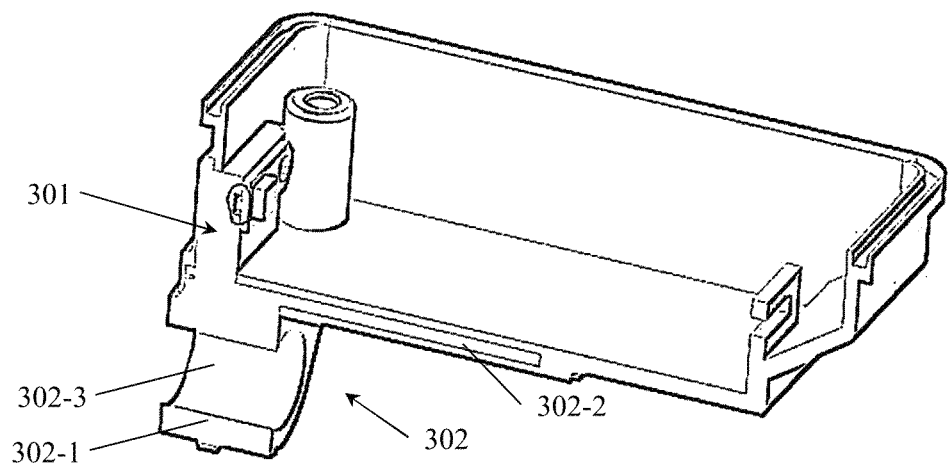
FIG. 3 is a cross-sectional view of a sensor assembly according to a preferred embodiment of the present invention.

Further preferably, as shown in FIGS. 2-3, the outer portion 302 is provided to extend outward from the inner portion 301 at the side wall of the housing 10 along the plane where the side wall lies, that is, it includes the first outer portion 302-1 extending along the side. Of course, the outer portion 302 can also extend in other directions or be disposed at other suitable positions. In addition, the outer portion 302 may further include a second outer portion 302-2 extending along the bottom surface of the housing 10 and rigidly contacting with the bottom surface, thereby further increasing the conductive area and improving the physical quantity transmission of the conductive member.

Further preferably, the outer portion 302 of the conductive member 30 may further include a structure or portion for rigidly connecting with the component 50 to be sensed through one or more of screw connection, snap connection, adhesion and welding. For example, as shown in FIGS. 2-3, the first outer portion 302-1 of the outer portion 302 may further include a hole 302-3, which is used to accommodate a bolt 303, and the sensor assembly is rigidly connected to the component 50 to be sensed by matching the bolt with a nut 304.

Further preferably, the sensor assembly may further include a bracket 101 rigidly installed in the housing 10 and a main circuit board 102 rigidly installed on the bracket (for example, by welding, adhesion, screw connection, snap connection, etc.). The vibration sensor 201 can be rigidly installed on the main circuit board 102. Therefore, the inner portion 301 of the conductive member 30, the housing 10, the bracket 101 and the main circuit board 102 constitute a vibration transmission path inside the housing, so that the vibration from the component 50 to be sensed received by the outer portion 302 of the conductive member 30 can be transmitted to the vibration sensor 201 through this vibration transmission path. In addition, the wireless communication module 40 may be disposed on the main circuit board 102. Preferably, the wireless communication module 40 can be implemented in various ways, such as GMS module, CDMA module, 3G/4G/5G communication module, WiFi module, etc.

It should also be understood that according to other modified embodiments, the vibration sensor 201 can be installed in the housing in various ways, for example, it can be directly and rigidly installed on the housing wall, the inner portion 301, etc., for example, it can be installed by adhesion, snapping, screwing, welding, etc., as long as it can receive vibration.

According to a preferred embodiment of the present invention, the sensor assembly may further include a wireless rechargeable battery 60 for supplying power to the electrical devices in the sensor assembly, and the sensor assembly may further include a wireless charging module (not shown) for charging the rechargeable battery 60, which includes components such as a wireless charging coil. For example, the wireless charging module can be arranged on the first sub-circuit board 103 separated from the main circuit board 102. Rechargeable batteries can supply power to energize electric consuming components such as the vibration sensor 201 and the wireless communication module 40, which greatly increases the working time of the sensor assembly and avoids the problem of frequent battery replacement. Of course, according to actual needs, disposable batteries and wired rechargeable batteries can also be used instead of the above-mentioned wireless rechargeable batteries.

Further preferably, the sensor assembly further includes a cover 70 made of nonmetallic material and hermetically connected with the housing 10. For example, the cover 70 is made of any suitable resin, plastic, rubber composite material, etc. and is connected to the housing 10 by ultrasonic welding, so that the non-metallic cover facilitates the signal of the wireless communication module 40 to pass through.

Further preferably, the housing 10 and the conductive member 30 can be made of the same or different metal materials. For example, in the case where the sensor assembly includes a vibration sensor 201 and a temperature sensor 202 described later, the conductive member 30 should be a good conductor of heat and have sufficient rigidity to transmit vibration. In addition, the conductive member 30 can be rigidly connected with the housing 10 by any suitable means (such as screw connection, adhesion, welding, snap connection, etc.) or integrally formed with the housing 10. This rigid connection and integral formation facilitate the transmission of the physical quantity from the member to be sensed to inside of the sensor assembly through the conductive member.

Figure 4:
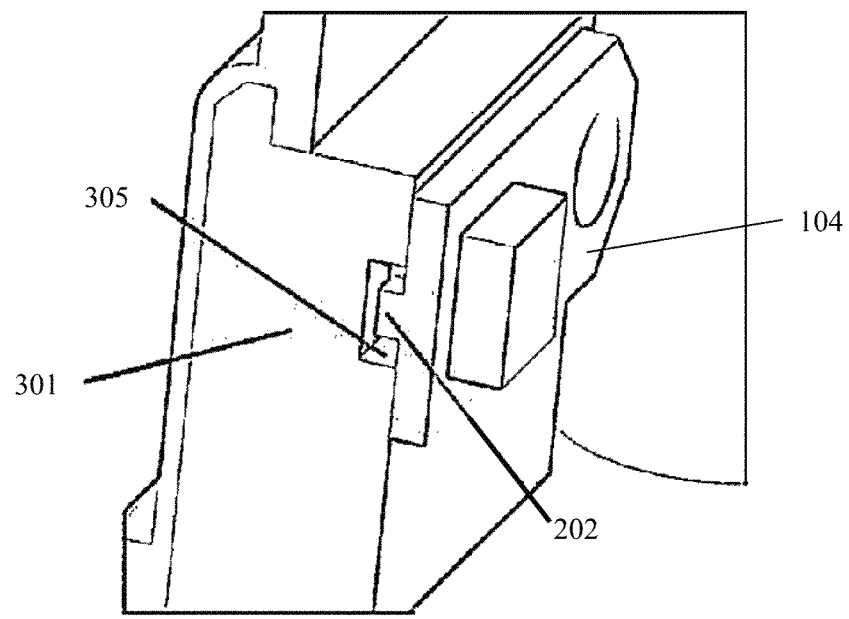
FIG. 4 is a partial enlarged view of a sensor assembly according to a preferred embodiment of the present invention.

According to another preferred embodiment of the present invention, referring to FIGS. 1 and 3-4, the sensor may further include a temperature sensor 202, which is installed to the inner portion 301 of the conductive member 30 to directly or indirectly contact with the inner portion. Therefore, the physical quantity includes heat from the component to be sensed. The temperature sensor 202 can be installed to the inner portion 301 by any suitable means such as screw connection, adhesion, welding, snap connection, etc. Due to being installed on the inner portion 301 of the conductive member 30, the heat transmission path is shortened, so that the temperature sensed by the temperature sensor 202 can more accurately reflect the actual temperature of the component to be sensed.

Further preferably, the inner portion 301 of the conductive member 30 may also have a groove 305 for accommodating the temperature sensor 202. Further preferably, the groove 305 can be filled with a thermal conductive substance (such as heat conducting glue, etc.), which at least partially surrounds and contacts the temperature sensor 202.

Further preferably, the temperature sensor 202 can be installed on the second sub-circuit board 104 separated from the above-mentioned main circuit board 102 and the first sub-circuit board 103, and the second sub-circuit board 104 can be installed to the inner portion 301 by means of screw connection, adhesion, welding, snap connection and the like, so that the temperature sensor 202 is located in the groove 305, as shown in FIG. 4. With this installation method, it can further facilitate the fixing of the temperature sensor 202 and the sensing of the temperature signal. Further referring to FIG. 1, the main circuit board 102 can be electrically connected with the first sub-circuit board 103 and the second sub-circuit board 104 through a flexible cable 105.

Only vibration sensor and temperature sensor are used as examples of sensors in the sensor assembly, and in the case of vibration sensor, the outer portion can be rigidly connected with the components to be sensed, and in the case of only temperature sensor, the outer portion may not be rigidly connected with the components to be sensed, but only need to realize effective heat transfer. Therefore, it should be understood that in the case of using other sensors for other component to be sensed, the connection between the outer portion and the component to be sensed can be selected according to the needs and the actual situation, as long as the outer portion can effectively receive the physical quantity from the component to be sensed.

In addition, according to some preferred embodiments of the present invention, the sensor assembly may further include a switch, a display means, a control circuit and/or an alarm (not shown).

Specifically, for example, the switch can be installed on the second sub-circuit board 104, which can be implemented in any suitable form (e.g., switches such as buttons, knobs, touch sensitive switches or automatic switches such as automatic timing switches, etc.), and the switch can be used to turn on or off the sensor assembly, adjust/calibrate the sensor, etc.

For example, the display means can be installed on the second sub-circuit board 104, which can be implemented as an LED lamp, a display screen, etc., for indicating the working state, parameters, etc. of the sensor assembly. In this case, the cover 70 of the sensor assembly may further include an opening for exposing the switch and/or the display means, and the opening may be sealed by a transparent film 701 to facilitate the observation and operation of the switch and/or the display means.

For example, the controller can be installed on the main circuit board 102 to process the sensor data and control other components in the sensor assembly. For example, when the sensor data is abnormal, the alarm can send out an alarm signal in any suitable way. Furthermore, an alarm (e.g., alarm lamp or buzzer) can be installed on the second sub-circuit board 104, and abnormal data can also be sent out through the wireless communication module 40.

Figure 5:
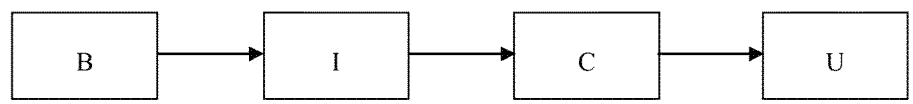
FIG. 5 is a diagram of a sensor assembly according to a preferred embodiment of the present invention, showing its typical application.

Refer further to FIG. 5, which shows a typical application of the present invention. Specifically, by adopting the sensor assembly I according to the present invention, the sensing signal (vibration and/or temperature) from the bearing B can be sensed by the sensor assembly I and transmitted to the cloud C through its internal wireless communication module (or can also be sent to remote computing devices such as servers and databases), and the user U can monitor the sensor data from the cloud C in real time through his own stationary/mobile device, or download the sensor data for analysis, etc.

It should be understood that although the present invention gives an example that the sensor assembly includes one vibration sensor and one temperature sensor, according to actual needs, more sensors or more types of sensors may be added to the sensor assembly without departing from the scope of the present invention.

Therefore, the invention provides a sensor assembly integrating wireless communication technology, which eliminates the data cables used by traditional sensors, and can be widely applied to scenarios such as limited installation spaces, inconvenient wiring, bad working conditions and the like of trains, subway trains and the like, so as to facilitate users to remotely obtain sensor data through the cloud. With the wireless rechargeable battery, the working time of the sensor assembly can be greatly increased (for example, the working time can be increased from 3 years to 10 years compared with the disposable battery).

The exemplary implementation of the scheme proposed in this disclosure has been described in detail above with reference to the preferred embodiments. However, it can be understood by those skilled in the art that without departing from the concept of this disclosure, various changes and modifications can be made to the above specific embodiments, and various technical features and structures proposed in this disclosure can be combined in various ways without exceeding the scope of protection of this disclosure, which is determined by the appended claims.

The invention claimed is:

1. A sensor assembly, comprising:
   housing;
   a sensor, disposed in the housing;
   a conductive member, having an inner portion located inside the housing and an outer portion located outside the housing,
   wherein the outer portion forms a portion of an outer most surface of the housing, and
   wherein the outer portion receives a physical quantity from a component to be sensed and transmits the physical quantity to the sensor through the inner portion, so that the sensor senses the physical quantity and generates a sensing signal;
   a wireless communication module, receiving the sensing signal and transmits an output signal corresponding to the sensing signal.

2. The sensor assembly according to claim 1, wherein the sensor comprises a vibration sensor, which is rigidly connected with the inner portion of the conductive member, and the physical quantity comprises vibration from the component to be sensed.

3. A sensor assembly, comprising:
   housing,
   a sensor, disposed in the housing,
   a conductive member, having an inner portion located inside the housing and an outer portion located outside the housing,
   wherein the outer portion receives a physical quantity from a component to be sensed and transmits the physical quantity to the sensor through the inner portion, so that the sensor senses the physical quantity and generates a sensing signal,
   a wireless communication module, receiving the sensing signal and transmits an output signal corresponding to the sensing signal,
   wherein the sensor assembly further comprises a bracket rigidly installed in the housing and a main circuit board rigidly installed on the bracket,
   wherein the sensor is a vibration sensor configured to measure vibrations,
   wherein the vibration sensor is rigidly installed on the main circuit board, and
   wherein the outer portion receives the vibration from the component to be sensed and transmits the vibration to the vibration sensor through a vibration transmission path in the housing, and the vibration transmission path includes the inner portion, the housing, the bracket and the main circuit board.

4. The sensor assembly of claim 1, wherein the inner portion of the conductive member is disposed along a side wall of the housing or forms a part of the side wall of the housing; and/or
   the outer portion of the conductive member includes a first outer portion extending along the plane where the side wall of the housing lies and a second outer portion extending along the bottom surface of the housing and rigidly contacting with the bottom surface.

5. A sensor assembly, comprising:
   housing;
   a sensor, disposed in the housing;
   a conductive member, having an inner portion located inside the housing and an outer portion located outside the housing,
   wherein the outer portion receives a physical quantity from a component to be sensed and transmits the physical quantity to the sensor through the inner portion, so that the sensor senses the physical quantity and generates a sensing signal;
   a wireless communication module, receiving the sensing signal and transmits an output signal corresponding to the sensing signal,
   wherein the sensor assembly also includes a wireless rechargeable battery for supplying power to electric devices in the sensor assembly, and the sensor assembly also includes a wireless charging module for charging the rechargeable battery;
   the sensor assembly also includes a cover made of nonmetallic materials and hermetically connected with the housing;
   wherein the housing and the conductive member are made of the same materials, and the conductive member is rigidly connected with the housing or integrally formed with the housing; or
   wherein in the component to be sensed includes a power machine or a vehicle that moves relative to the ground.

6. The sensor assembly according to claim 1, wherein the sensor comprises a temperature sensor installed to the inner portion of the conductive member to directly or indirectly contact the inner portion, and
   wherein the physical quantity includes heat from the component to be sensed.

7. The sensor assembly according to claim 6, wherein the inner portion has a groove for accommodating the temperature sensor.

8. The sensor assembly as claimed in claim 7, wherein the groove is filled with a thermal conductive substance, and the thermal conductive substance at least partially surrounds and contacts the temperature sensor.

9. A method for using a sensor assembly of claim 1, the method comprising:
   directly or indirectly rigidly connecting the outer portion of the conductive member with a component included in a power machine or a vehicle moving relative to the ground, and the component is used as the component to be sensed.

10. The method according to claim 9, wherein the component to be sensed includes a site where the physical quantity is generated,
    the part where the outer portion of the conductive member is directly or indirectly rigidly connected with the component to be sensed is set close to the position where the physical quantity is generated.

11. A sensor assembly, comprising:
    housing;
    a sensor, disposed in the housing;

a conductive member, having an inner portion located inside the housing and an outer portion located outside the housing,
wherein the outer portion receives a physical quantity from a component to be sensed and transmits the physical quantity to the sensor through the inner portion, so that the sensor senses the physical quantity and generates a sensing signal;
a wireless communication module, receiving the sensing signal and transmits an output signal corresponding to the sensing signal,
wherein the sensor assembly also includes a wireless rechargeable battery for supplying power to electric devices in the sensor assembly, and the sensor assembly also includes a wireless charging module for charging the rechargeable battery;
the sensor assembly also includes a cover made of non-metallic materials and hermetically connected with the housing;
wherein the housing and the conductive member are made of different materials, and the conductive member is any one of the group of rigidly connected with the housing and integrally formed with the housing; and
wherein in the component to be sensed includes a power machine or a vehicle that moves relative to the ground.

* * * * *